US012545021B2

(12) United States Patent
Nakahara et al.

(10) Patent No.: US 12,545,021 B2
(45) Date of Patent: Feb. 10, 2026

(54) SHEET PROCESSING APPARATUS AND IMAGE FORMING SYSTEM

(71) Applicant: CANON KABUSHIKI KAISHA, Tokyo (JP)

(72) Inventors: Yasuhiro Nakahara, Kanagawa (JP); Naoyuki Maeda, Shizuoka (JP); Hideki Ohta, Shizuoka (JP); Jun Agata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/333,227

(22) Filed: Jun. 12, 2023

(65) Prior Publication Data

US 2023/0406010 A1 Dec. 21, 2023

(30) Foreign Application Priority Data

Jun. 17, 2022 (JP) ................................ 2022-097761

(51) Int. Cl.
*B65H 35/00* (2006.01)
*B41F 13/56* (2006.01)
*B41J 11/66* (2006.01)

(52) U.S. Cl.
CPC ............... *B41F 13/56* (2013.01); *B41J 11/66* (2013.01)

(58) Field of Classification Search
CPC ..... B65H 35/00; B65H 35/0073; B41F 13/56; B41J 11/66; G03G 15/6582; G03G 2215/00818
USPC ...................................................... 270/58.07
See application file for complete search history.

(56) References Cited

U.S. PATENT DOCUMENTS 7,387,059 B2 * 6/2008 Kobayashi ........... G03G 15/553 83/167
8,480,070 B2 * 7/2013 Abe ..................... B26D 7/1845 270/52.17

FOREIGN PATENT DOCUMENTS

JP H10279170 A 10/1998
JP 2001025995 A 1/2001
JP 2006150513 A * 6/2006
JP 4236565 B2 * 3/2009 ............... B26D 7/18

(Continued)

OTHER PUBLICATIONS

Espacenet machine translation of JP2014201421A; https://translationportal.epo.org/emtp/translate/?ACTION=description-retrieval&COUNTRY=JP&ENGINE=google&FORMAT=docdb&KIND=A&LOCALE=en_EP&NUMBER=2014201421&OPS=ops.epo.org/3.2&SRCLANG=ja&TRGLANG=en (Year: 2014).*

*Primary Examiner* — Leslie A Nicholson, III
(74) *Attorney, Agent, or Firm* — Canon U.S.A., Inc. IP Division

(57) ABSTRACT

A sheet processing apparatus to process a sheet includes a first conveyance path, a punching unit, a storage unit, a movement unit, and a receiving unit. The punching unit punches the sheet conveyed in the first conveyance path. The storage unit is removable from the sheet processing apparatus and stores punch chips generated by the punching unit. The movement unit moves together with the punching unit in a direction parallel to a movement direction of the punching unit. The receiving unit is between the movement unit and the storage unit and receives the punch chips from the punching unit via the movement unit while supporting the movement unit. When the storage unit is removed in a state in which punch chips stored in the storage unit have accumulated to reach the receiving unit, some of the punch (Continued)

chips that have reached the receiving unit are leveled by the receiving unit.

10 Claims, 16 Drawing Sheets

(56) References Cited

FOREIGN PATENT DOCUMENTS

| | | | |
|---|---|---|---|
| JP | 2014101211 | A | 6/2014 |
| JP | 2014201421 | A | 10/2014 |

* cited by examiner

SHEET PROCESSING APPARATUS AND IMAGE FORMING SYSTEM

BACKGROUND

Field

The present disclosure relates to a sheet processing apparatus that processes a sheet and an image forming system that forms an image on a sheet.

Description of the Related Art

A sheet processing apparatus that performs processing such as binding processing and sorting processing on a sheet on which an image is formed in a main body of an image forming apparatus is used as an option of the image forming apparatus, such as an electrophotographic multifunction peripheral.

Japanese Patent Application Laid-Open No. H10-279170 discusses a post-processing apparatus that detects a side end of a sheet by a side end detection sensor, moves a punching blade unit in a width direction based on a size of the sheet, and adjusts a punching position of a punching device.

In a case where the punching device punches a sheet, punch chips accumulate in the post-processing apparatus, so that a user or a service person needs to regularly dispose of the punch chips accumulated in the post-processing apparatus. Thus, a configuration in which a storage unit that stores punch chips is removable may be adopted in some cases.

SUMMARY

The present disclosure is directed to preventing punch chips from falling when a storage unit is to be removed.

According to an aspect of the present disclosure, a sheet processing apparatus configured to process a sheet being conveyed includes a first conveyance path for receiving the sheet, a punching unit configured to punch the sheet conveyed in the first conveyance path, a storage unit configured to be removable from the sheet processing apparatus and to store punch chips generated by the punching unit, a movement unit configured to support the punching unit and to move together with the punching unit in a direction parallel to a movement direction of the punching unit, and a receiving unit placed between the movement unit and the storage unit and configured to receive the punch chips from the punching unit via the movement unit while supporting the movement unit, wherein, in a case where the storage unit is removed in a state in which punch chips stored in the storage unit have accumulated in the storage unit to reach the receiving unit, some of the punch chips that have reached the receiving unit are leveled by the receiving unit.

Further features of the present disclosure will become apparent from the following description of exemplary embodiments with reference to the attached drawings.

DESCRIPTION OF THE EMBODIMENTS

Exemplary embodiments according to the present disclosure will be described below with reference to the attached drawings.

[Overall Configuration]

An image forming system 1S according to a first exemplary embodiment includes an image forming apparatus 1, an image reading apparatus 2, a document feeding apparatus 3, and a post-processing apparatus 4. The image forming system 1S forms an image on a sheet as a recording material, processes the sheet using the post-processing apparatus 4 as necessary, and outputs the sheet. An operation of each apparatus is briefly described, and then the post-processing apparatus 4 is described in detail.

Figure 1:
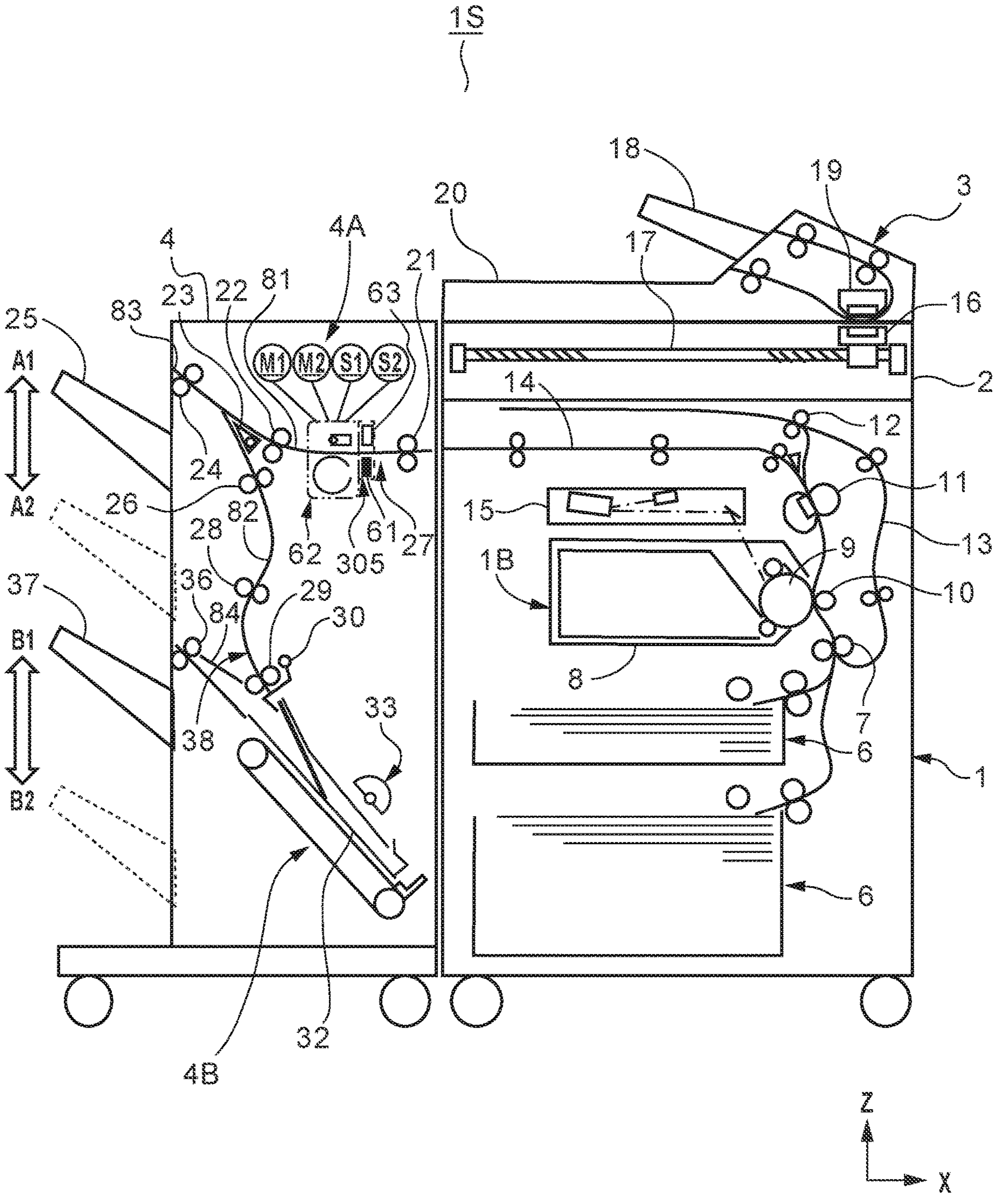
FIG. 1 is an entire schematic diagram illustrating an image forming system according to a first exemplary embodiment.

Before describing the apparatuses, the coordinate system is defined. In the following description, an X direction, a Z direction, and a Y direction are defined as a width direction, a height direction, and a depth direction of the apparatus, respectively (a horizontal direction, a vertical direction, and a paper surface direction in FIG. 1). The Y direction is both the depth direction of the apparatus and a direction of an end portion of a sheet. In the following description, a coordinate system indicated near each graphic symbol is the coordinate system of each graphic symbol.

The document feeding apparatus 3 conveys a document placed on a document tray 18 to image reading units 16 and 19. The image reading units 16 and 19 are image sensors each reading image information from a document surface, and both sides of the document are read in one document conveyance. The document of which the image information is read is discharged to a document discharge unit 20. The image reading apparatus 2 reciprocates the image reading unit 16 by a driving device 17 and thus can read image information from a stationary document set on a document glass plate (including a document such as a booklet document for which the document feeding apparatus 3 cannot be used).

The image forming apparatus 1 is an electrophotographic apparatus equipped with an image forming unit 1B of a direct transfer type. The image forming unit 1B includes a cartridge 8 equipped with the photosensitive drum 9 and a laser scanner unit 15 arranged above the cartridge 8. In a case where an image forming operation is performed, a surface of the rotating photosensitive drum 9 is charged, and the laser scanner unit 15 exposes the photosensitive drum 9 with light based on the image information to draw an electrostatic latent image on the drum surface. The electrostatic latent image carried on the photosensitive drum 9 is developed into a toner image with charged toner particles, and the toner image is conveyed to a transfer portion where the photosensitive drum 9 and a transfer roller 10 face each other. A control unit of the image forming apparatus 1 performs the image forming operation by the image forming unit 1B based on the image information read by the image reading units 16 and 19 or image information received from an external computer via a network.

The image forming apparatus 1 includes a plurality of feeding devices 6 that feeds sheets as recording materials one by one at a predetermined interval. Skew feeding of a sheet fed from the feeding device 6 is corrected by registration rollers 7 and then the sheet is conveyed to the transfer portion. In the transfer portion, the toner image carried on the photosensitive drum 9 is transferred to the sheet. A fixing unit 11 is arranged downstream of the transfer portion in a sheet conveyance direction. The fixing unit 11 includes a pair of rotating members that pinch and convey the sheet, and a heating element such as a halogen lamp for heating the toner image, and performs fixing processing on the image by heating and pressing the toner image on the sheet.

In a case where the sheet on which the image is formed is discharged out of the image forming apparatus 1, the sheet having passed through the fixing unit 11 is conveyed through a horizontal conveyance portion 14 to the post-processing apparatus 4. In a case of a sheet on which image formation on a first surface is completed in double-sided printing, the sheet having passed through the fixing unit 11 is transferred to reversing rollers 12, conveyed by the reversing rollers 12 in a switchback manner, and conveyed again to the registration rollers 7 via a reconveyance portion 13. The sheet passes through the transfer portion and the fixing unit 11 again, and thus an image is formed on a second surface of the sheet. Then, the sheet is conveyed through the horizontal conveyance portion 14 to the post-processing apparatus 4.

The image forming unit 1B as described above is an example of an image forming unit that forms an image on a sheet, and an intermediate transfer type electrophotographic unit, in which a toner image formed on a photosensitive member is transferred to a sheet via an intermediate transfer member, may be used. A print unit adopting an inkjet method or an offset printing method may be used as an image forming unit.

[Post-Processing Apparatus]

The post-processing apparatus 4 includes a punching processing unit 4A that performs punching processing on sheets and a binding processing unit 4B that performs binding processing on the sheets, performs punching processing and binding processing on sheets received from the image forming apparatus 1, and discharges the sheets as a sheet bundle. The post-processing apparatus 4 can simply discharge a sheet received from the image forming apparatus 1 without performing punching processing and binding processing on the sheet.

The post-processing apparatus 4 is provided with a receiving path 81, an inner discharge path 82, a first discharge path 83, and a second discharge path 84 as conveyance paths for conveying the sheet and is provided with an upper discharge tray 25 and a lower discharge tray 37 as discharge destinations for discharging the sheet. The receiving path 81 as a first conveyance path is a conveyance path for receiving the sheet from the image forming apparatus 1 and conveying the sheet, and the inner discharge path 82 as a second conveyance path is a conveyance path that extends below the receiving path 81 and guides the sheet to the binding processing unit 4B. The first discharge path 83 is a conveyance path for discharging the sheet to the upper discharge tray 25, and the second discharge path 84 as a third conveyance path is a conveyance path that extends along a sheet discharge direction and guides the sheet to the lower discharge tray 37.

The sheet discharged from the horizontal conveyance portion 14 of the image forming apparatus 1 is received by inlet rollers 21 as a conveyance unit arranged in the receiving path 81, and conveyed through the receiving path 81 toward pre-reversing rollers 22. An inlet sensor 27 detects the sheet at a detection position between the inlet roller 21 and the pre-reversing roller 22. The pre-reversing rollers 22 convey the sheet received from the inlet rollers 21 toward the first discharge path 83.

At a predetermined timing after the inlet sensor 27 detects passage of a sheet trailing edge, the pre-reversing rollers 22 accelerate a conveyance speed of the sheet to a speed higher than a conveyance speed in the horizontal conveyance portion 14. The conveyance speed of the sheet in the inlet rollers 21 may be set higher than that in the horizontal conveyance portion 14, and the conveyance speed may be accelerated by the inlet rollers 21 upstream of the pre-reversing rollers 22. In this case, it is desirable to install a one-way clutch between a conveyance roller on the horizontal conveyance portion 14 and a motor that drives it so that the conveyance roller idles even if the inlet rollers 21 pull the sheet.

In a case where the discharge destination of the sheet is the upper discharge tray 25, reversing rollers 24 discharge the sheet received from the pre-reversing rollers 22 to the upper discharge tray 25. In this case, the reversing rollers 24 decelerate to a predetermined discharge speed at a predetermined timing after the sheet trailing edge passes the pre-reversing rollers 22.

In a case where the discharge destination of the sheet is the lower discharge tray 37, the reversing rollers 24 as a reversing unit perform switchback conveyance to reverse the sheet received from the pre-reversing rollers 22 and convey the sheet to the inner discharge path 82. A backflow prevention valve 23 is arranged at a branching portion where the receiving path 81 and the inner discharge path 82 branch off from the first discharge path 83 upstream of the reversing rollers 24 in the sheet discharge direction of the reversing rollers 24. The backflow prevention valve 23 has a function of regulating a reverse flow of the sheet switched back by the reversing rollers 24 to the receiving path 81. The pre-reversing rollers 22 reverse a rotation direction at a timing when the sheet trailing edge passes through the backflow prevention valve 23.

Inner discharge rollers 26, intermediate conveyance rollers 28, and kick-out rollers 29, which are rotary member pairs arranged in the inner discharge path 82, convey the sheet received from the reversing rollers 24 toward the binding processing unit 4B while delivering the sheet in order. In a case where the sheet is buffered, the inner discharge rollers 26 pause while nipping a preceding sheet. The inner discharge rollers 26 perform buffering by reversely rotating in synchronization with a succeeding sheet heading for the reversing rollers 24 and overlapping the preceding sheet on the succeeding sheet in the first discharge path 83. As for the sheet buffering, the inner discharge rollers 26 repeat the switchback and thus can buffer a plurality of sheets regardless of a sheet length.

An intermediate pre-stacking sensor 38 detects the sheet between the intermediate conveyance roller 28 and the kick-out roller 29. As the inlet sensor 27 and the intermediate pre-stacking sensor 38, an optical sensor that detects presence or absence of a sheet at the detection position using light can be used.

The binding processing unit 4B includes an intermediate lower guide 32 as a stacking unit on which sheets are stacked, an alignment mechanism 33, and a stapler (not illustrated), aligns the sheets received from the inner discharge path 82 using the alignment mechanism 33, and then binds the sheets at a predetermined position using the stapler. A bundle of sheets bound by the binding processing unit 4B is delivered to bundle discharge rollers 36 via the second discharge path 84, discharged out of the apparatus by the bundle discharge rollers 36 as a discharge unit, and stacked on the lower discharge tray 37.

Both of the upper discharge tray 25 and the lower discharge tray 37 can vertically move with respect to a housing of the post-processing apparatus 4. The post-processing apparatus 4 is equipped with sheet surface detection sensors that detect upper surface positions of the sheets in the upper discharge tray 25 and the lower discharge tray 37, and in a case where one of the sensors detects the sheet, the corresponding tray is lowered in an A2 or B2 direction. In a case where the sheet surface detection sensor detects that the sheet is removed from the upper discharge tray 25 or the lower discharge tray 37, the tray is raised in an A1 or B1 direction. Thus, the upper discharge tray 25 and the lower discharge tray 37 are controlled to move up and down so as to keep the upper surface of the stacked sheet constant.

(Punching Processing Unit 4A)

Figure 2:
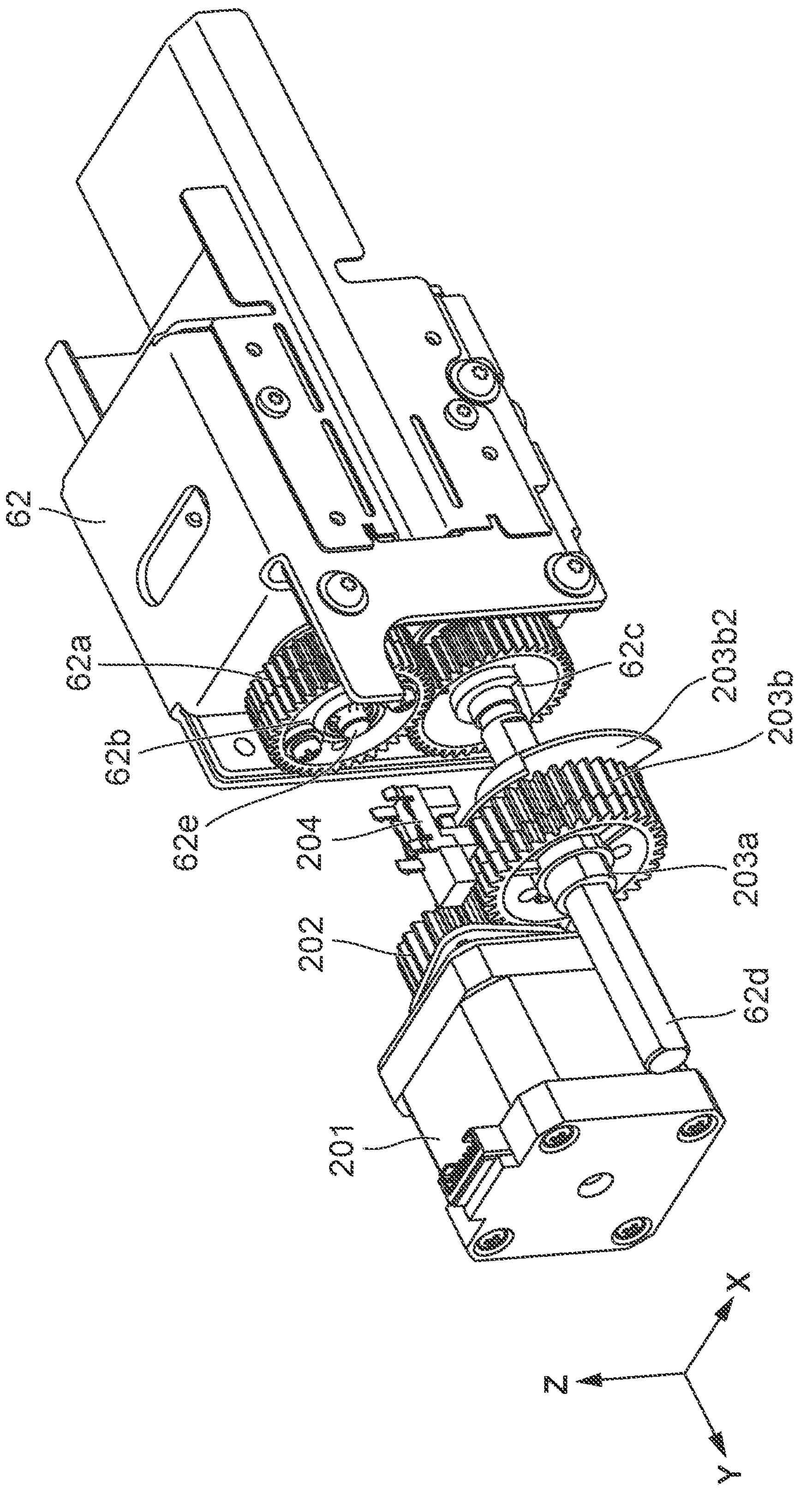
FIG. 2 is a perspective view of a drive mechanism of a punching unit.

The punching processing unit 4A that performs punching processing on a sheet is described in detail. FIG. 2 is a perspective view illustrating a drive configuration of a punch unit 62 as a punching unit that is included in the punching processing unit 4A (a punching device). The coordinate system in FIG. 2 is also the same as that in FIG. 1, and the sheet conveyance direction is the −X direction. A stepping motor 201 in FIG. 2 corresponds to a punch motor M1 in FIGS. 1 and 4A to 4C. The stepping motor 201 includes a pinion gear 202. Gears 203*a* and 203*b* drive a rotating shaft 62*d* of a die blade of the punch unit 62. A gear 62*c* rotates with the rotating shaft 62*d* of the die blade (not illustrated) of the punch unit 62. The gear 62*c* is engaged with gears 62*b* and 62*a* attached to a rotation center shaft 62*e* of a punching blade (not illustrated) of the punch unit 62. The gears 62*a*, 62*b*, and 62*c* are adjusted to match phases so that the punching blade and a die (not illustrated) of the punch unit 62 can engage.

A photo interrupter sensor 204 corresponds to a punch position sensor S1 in FIGS. 1 and 4A to 4C. The control unit (not illustrated) controls a position of a blade unit (not illustrated) of the punch unit 62 by setting a position at which a signal changes when a light is blocked by a flange portion 203*b*2 of the gear 203*b* as a home position of the blade unit.

Figure 3:
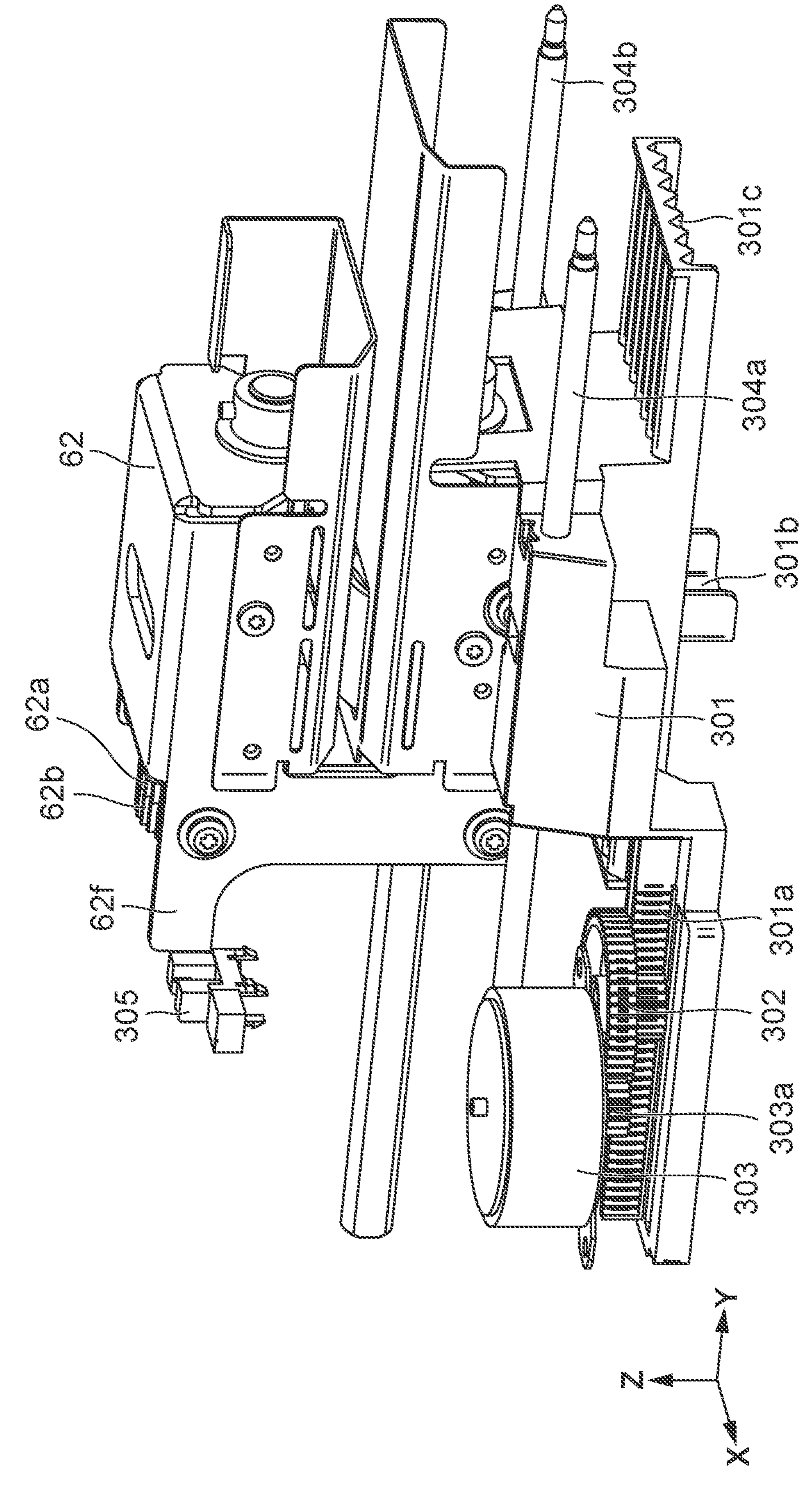
FIG. 3 is a perspective view of the drive mechanism of the punching unit.

FIG. 3 is a detail view illustrating a drive configuration to move the punch unit 62 in the direction of the end portion of the sheet. The coordinate system in FIG. 3 is also the same as that in FIG. 1, and the sheet conveyance direction is the −X direction. Guide shafts 304*a* and 304*b* are guided members for moving the punch unit 62 in the direction of the end portion. Axial directions of the guide shafts 304*a* and 304*b* are arranged parallel to the direction of the end portion. A sending unit 301 supports the punch unit 62 on its upper part, guides punch chips to a storage unit (not illustrated), and is a movement unit that moves together with the punch unit 62.

The sending unit 301 includes a rack gear 301*a* for connection to drive in the direction of the end portion. A guide hole portion 301*b* guides the punch chips (not illustrated) to a waste box 64. A first regulating portion 301*c* faces the waste box 64 and regulates the punch chips. The first regulating portion 301*c* is formed of a plurality of irregularities with the same cross sectional shape in the Y direction.

There is an idler gear 302. A stepping motor 303 corresponds to a motor M2 for adjusting an end portion position in FIGS. 1 and 4A to 4C. The stepping motor 303 includes a pinion gear 303*a*. The pinion gear 303*a* moves the rack gear 301*a* in the direction of the end portion (the same direction as a pull-out direction) via the idler gear 302.

A photo interrupter sensor 305 corresponds to a punch home position sensor S2 (in FIGS. 1 and 4A to 4C). A part of a sheet metal of a frame of the punch unit 62 has a light shielding shape 62*f* for shielding the photo interrupter sensor 305 from light. The punch unit 62 shields the photo interrupter sensor 305 from light using the light shielding shape 62*f*, and thus the home position in the direction of the end portion is controlled by the control unit.

Figure 4A:
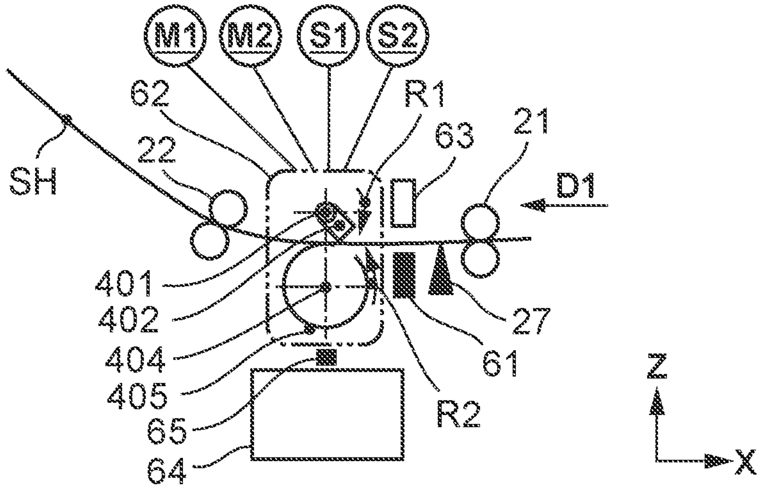
FIG. 4A is a cross-sectional view of an operation of the punching unit.
Figure 4B:
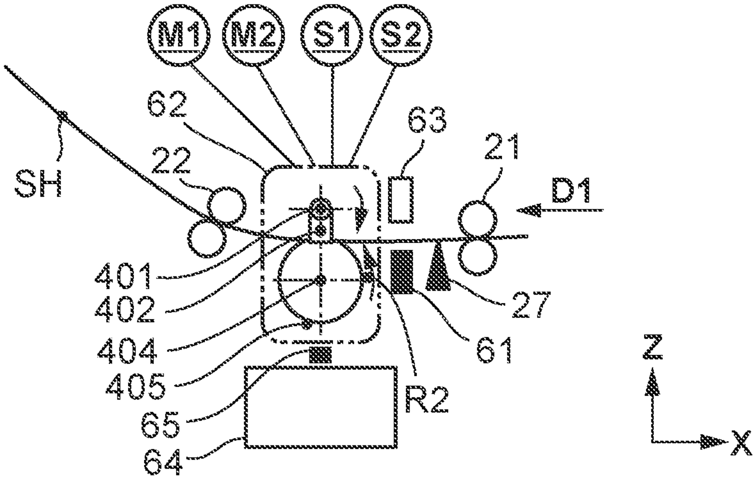
FIG. 4B is a cross-sectional view of an operation of the punching unit.
Figure 4C:
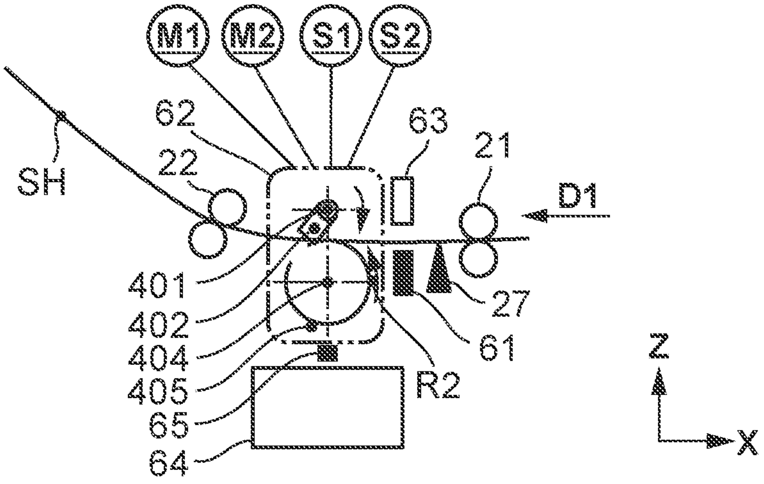
FIG. 4C is a cross-sectional view of an operation of the punching unit.

FIGS. 4A to 4C are cross-sectional views illustrating operations of the punch unit 62. As illustrated in FIGS. 4A to 4C, the inlet rollers 21 that convey a sheet SH in a sheet conveyance direction D1 are provided just in front of the punch unit 62. A lighting unit 63 and a line sensor 61 are provided between the inlet rollers 21 and the punch unit 62. The lighting unit 63 and the line sensor 61 are arranged to face each other across the receiving path 81 (see FIG. 1).

The line sensor 61 extends in the width direction of the sheet SH perpendicular to the sheet conveyance direction D1, and changes an output value based on a position in the width direction of the end portion of the sheet SH. More specifically, the line sensor 61 includes an optical sensor and changes an output value based on a boundary position of a grayscale difference in the line sensor 61 that appears by the light emitted from the lighting unit 63 being blocked by the sheet SH. Accordingly, it is possible to detect a position of a side end that is the end portion in the width direction of the sheet SH.

The punch unit 62 as the punching unit includes a punch 402 that rotates in an RB direction around an axis center 401 as an axis, and a die 405 that rotates in an R2 direction opposite to the R1 direction around an axis center 404. The punch 402 and the die 405 are synchronously rotated by the punch motor M1 so that a blade edge of the punch 402 and a hole portion of the die 405 fit together. The punch motor M1 is configured to drive so that a speed of the blade edge of the punch 402 in a circumferential direction is the same as a speed of the sheet SH in the sheet conveyance direction D1 and to be able to punch the sheet SH while conveying the sheet.

FIG. 4A is a schematic diagram illustrating the punch 402 located at a punching start position.

FIG. 4B is a schematic diagram illustrating the punch 402 located at a punching completion position. FIG. 4C is a schematic diagram illustrating the punch 402 located at a separation position. The punch 402 rotating in the R1 direction starts contacting the sheet SH at the punching start position, and fits into the die 405 at the punching completion position. The punch 402 separates from the sheet SH at the separation position. After the inlet sensor 27 detects a leading edge of the sheet SH, the punch 402 is rotated at a predetermined timing and thus can punch the conveyed sheet SH at various hole pitches.

As a result of performing sheet punching processing in the above-described operation, falling punch chips accumulate in the waste box 64, which is the storage unit. A full load detection sensor 65, which is a detection unit, is provided between the waste box 64 and the punch unit 62.

Figure 5:
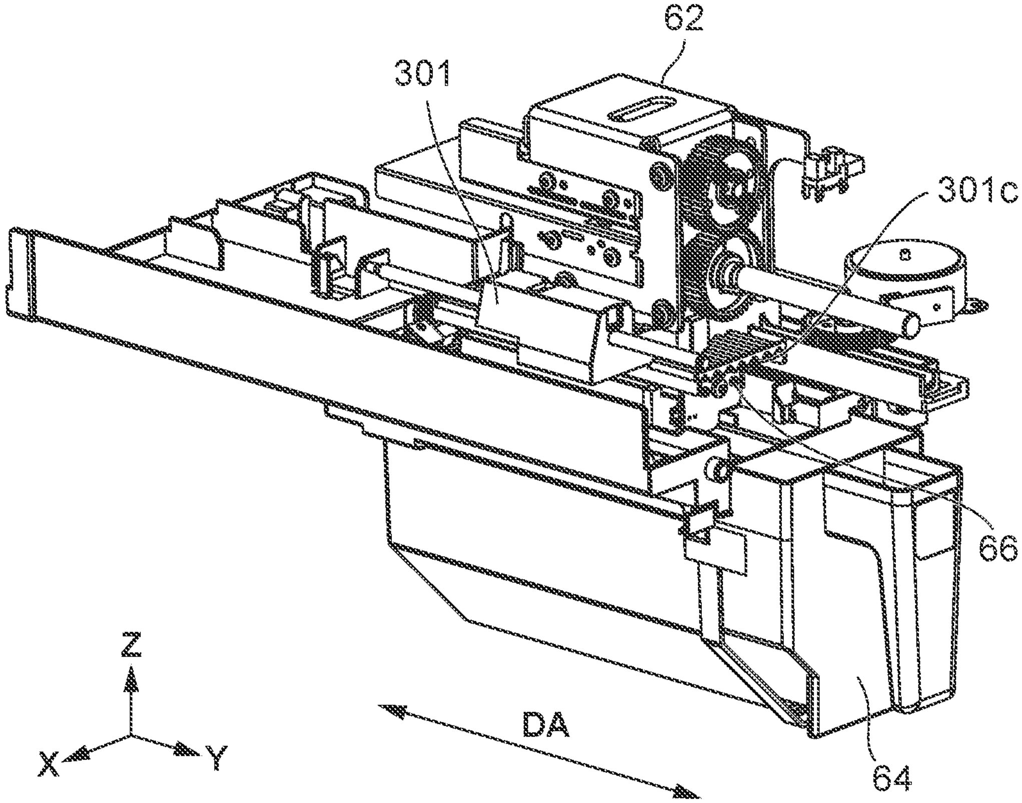
FIG. 5 is a perspective view of the punching unit, a storage unit, and a sending unit.
Figure 6:
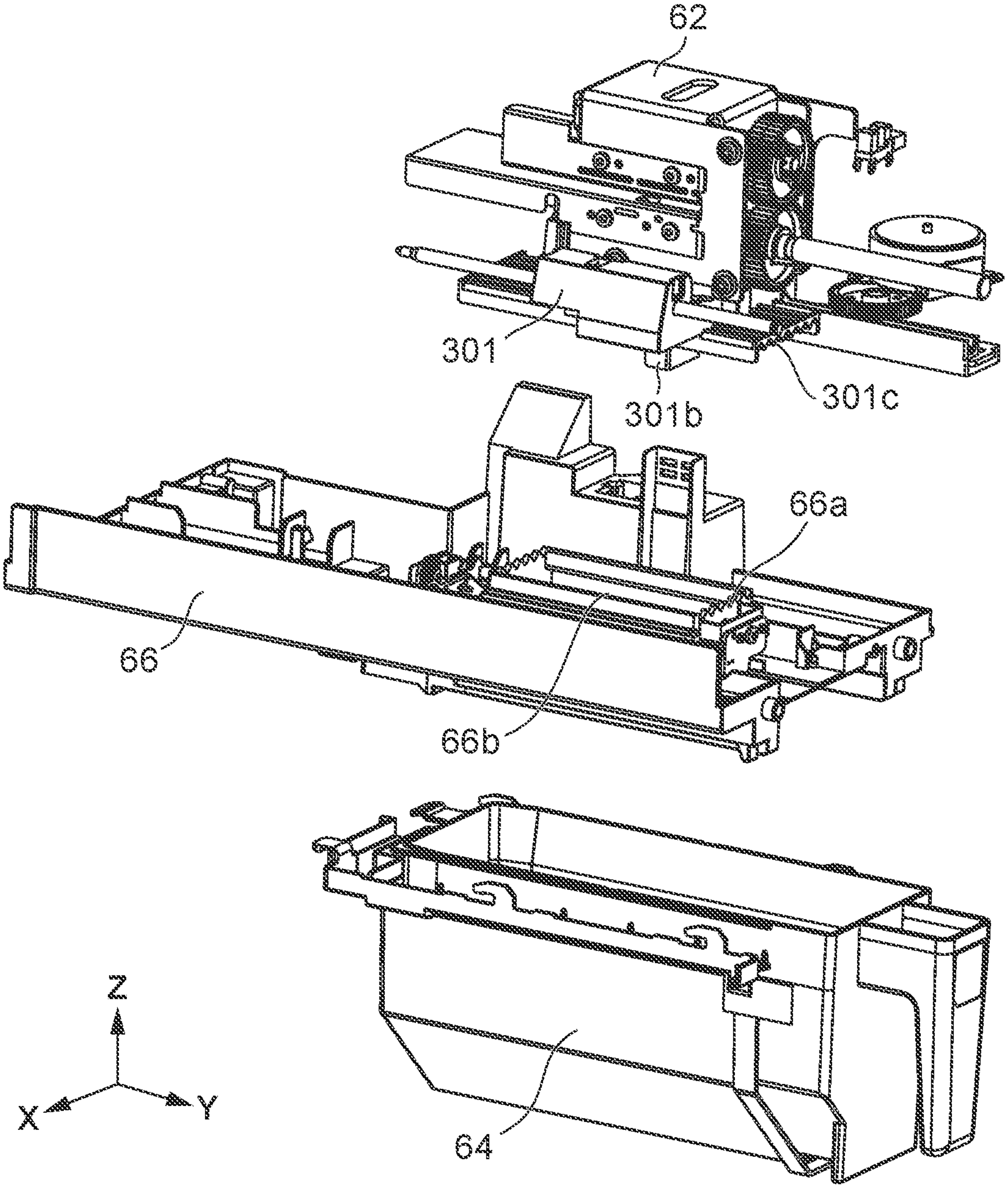
FIG. 6 is an exploded perspective view of the punching unit, the storage unit, and the sending unit.
Figure 7:
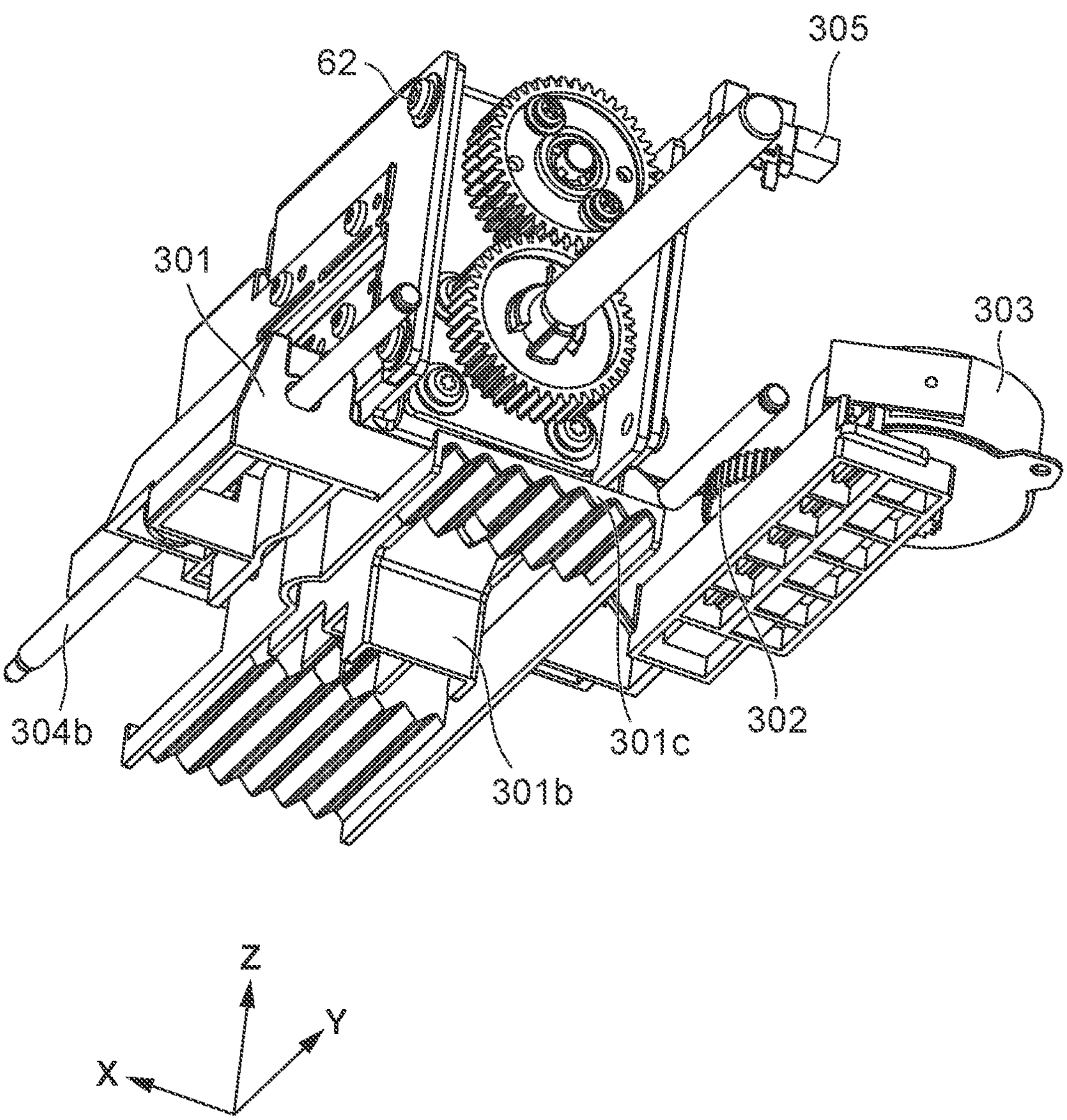
FIG. 7 is a perspective view of a movement unit viewed from below.

FIG. 5 is a perspective view of the punch unit 62, the waste box 64, and the sending unit 301. FIG. 6 is an exploded perspective view of the punch unit 62, the waste box 64, and the sending unit 301. FIG. 7 is a perspective view of the punch unit 62 and the sending unit 301, which are viewed from below, for illustrating the first regulating portion 301*c* of the sending unit 301.

The punch chips (not illustrated) generated in punching by the punch unit 62 are discharged from a hole (not illustrated) formed on a −Z side surface side of the punch unit 62 to the guide hole portion 301*b* of the sending unit 301. A receiving unit 66 includes a guide hole portion 66*b*. The guide hole portion 66*b* has a function of guiding the punch chips (not illustrated) sent from the guide hole portion 301*b* to the waste box 64. The punch chips (not illustrated) that enter the guide hole portion 301*b* of the sending unit 301 are transferred to the guide hole portion 66*b* of the receiving unit 66. The punch chips (not illustrated) that enter the guide hole portion 66*b* are guided by the guide hole portion 66*b* into the waste box 64 and stored in the waste box 64.

A second regulating portion 66*a* of the receiving unit 66 is formed near the guide hole portion 66*b* of the receiving unit 66. The first regulating portion 301*c* and the second regulating portion 66*a* face each other and form a certain gap therebetween. A detailed shape of the second regulating portion 66*a* is described with reference to FIG. 9.

Figure 8A:
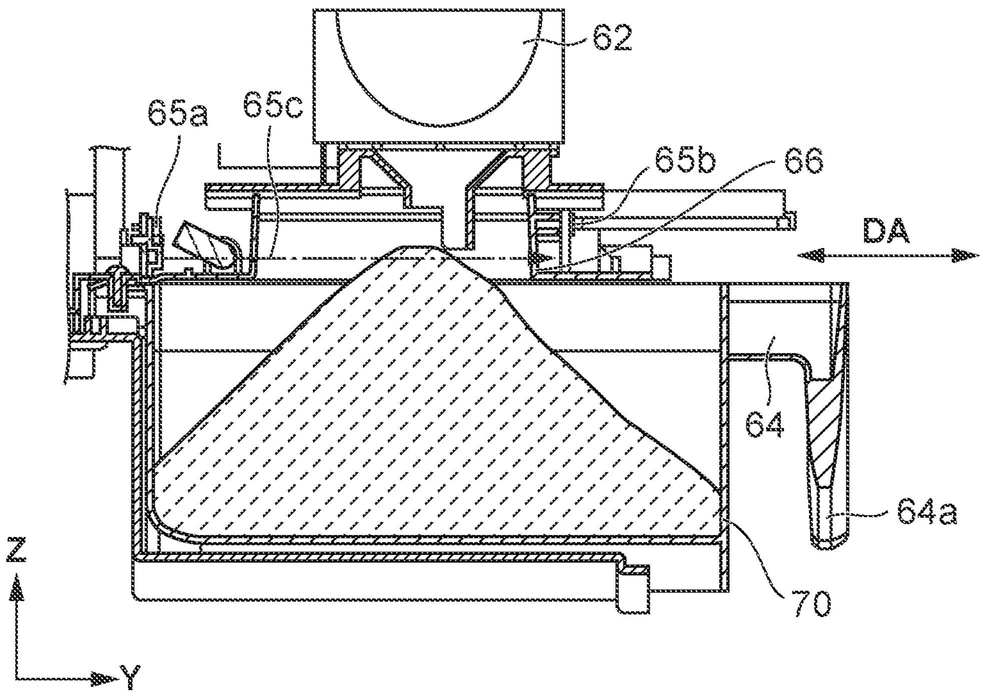
FIG. 8A is a cross-sectional view illustrating a state of pulling out from a receiving unit.
Figure 8B:
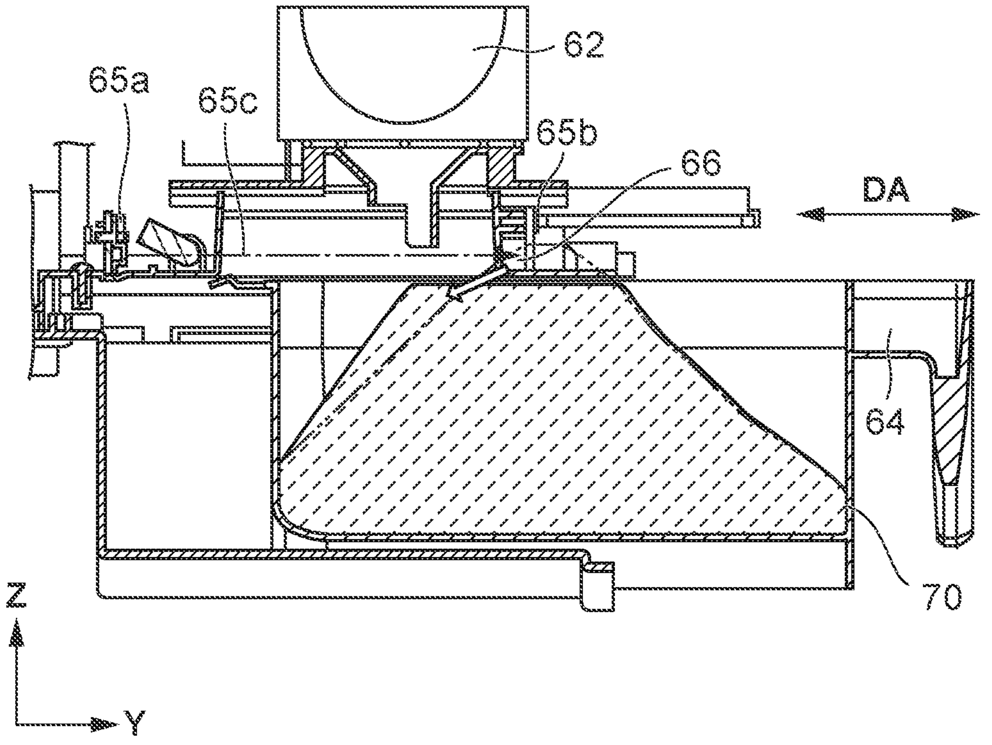
FIG. 8B is a cross-sectional view illustrating a state of pulling out from the receiving unit.

FIGS. 8A and 8B are cross-sectional views illustrating states in which a user or a service person grips a grip portion 64*a* of the waste box 64 and pulls the waste box 64 out of the receiving unit 66 to replace the waste box 64. FIG. 8A illustrates a state before the waste box 64 is pulled out, and FIG. 8B illustrates a state where the waste box 64 is in the middle of being pulled out.

The full load detection sensor 65 provided in the receiving unit 66 functions as a transmission optical sensor by a light-emitting unit 65*a* and a light-receiving unit 65*b* that receives the light emitted from the light-emitting unit 65*a*. The full load detection sensor 65 is arranged so that an optical path 65*c* from the light-emitting unit 65*a* to the light-receiving unit 65*b* is substantially parallel to an insertion direction of the waste box 64, and is placed above the waste box 64.

FIG. 7 is a perspective view of the sending unit 301 in FIG. 6 viewed from below, and the above-described first regulating portion 301*c* is formed along both end portions of the guide hole portion 301*b* of the sending unit 301 in the Y direction. The punch unit 62 and the sending unit 301 move in the Y direction as described with reference to FIG. 3. Thus, it is necessary to provide a certain gap between the first regulating portion 301*c* of the sending unit 301 and the second regulating portion 66*a* of the receiving unit 66.

The punch chips may leak out from the gap between the first regulating portion 301*c* of the sending unit 301 and the second regulating portion 66*a* of the receiving unit 66. Thus, in order to prevent the punch chips from leaking out, it is necessary to maintain a gap relationship between the first regulating portion 301*c* and the second regulating portion 66*a*. Accordingly, the same shape portion of the Y-direction cross section of the first regulating portion 301*c* is longer than a movement stroke length in the Y-direction.

As illustrated in FIG. 8A, punch chips 70 generated by the punch unit 62 accumulate in the waste box 64 via the guide hole portion 66*b* of the sending unit 301 (FIG. 7). As an accumulation amount of the punch chips 70 increases, the punch chips 70 accumulate in a mountain shape directly below and near the punch unit 62.

A top part of the punch chips 70 accumulated in the mountain shape in the waste box 64 reaches the receiving unit 66. When the punch chips 70 block light to the transmission optical sensor, it is possible to detect that the waste box 64 is full.

As illustrated in FIG. 8B, the punch chips 70 accumulate in the mountain shape over a top surface of the waste box 64. In a case where the waste box 64 is pulled out to dispose of the punch chips 70, the receiving unit 66, which is provided above the waste box 64 and outside a drop point of the punch chips 70, levels the top part of the mountain, smooths a surface, and moves the punch chips 70 to a space where the accumulation amount is small. As described above, the full load detection sensor 65 is placed above the waste box 64, so that the punch chips 70 can accumulate over the top surface of the waste box 64. Further, the waste box 64 is pulled out, and the receiving unit 66 moves the punch chips 70 to the space where the accumulation amount is small, so that an allowable accumulation amount of the waste box 64 can be increased.

Figure 9:
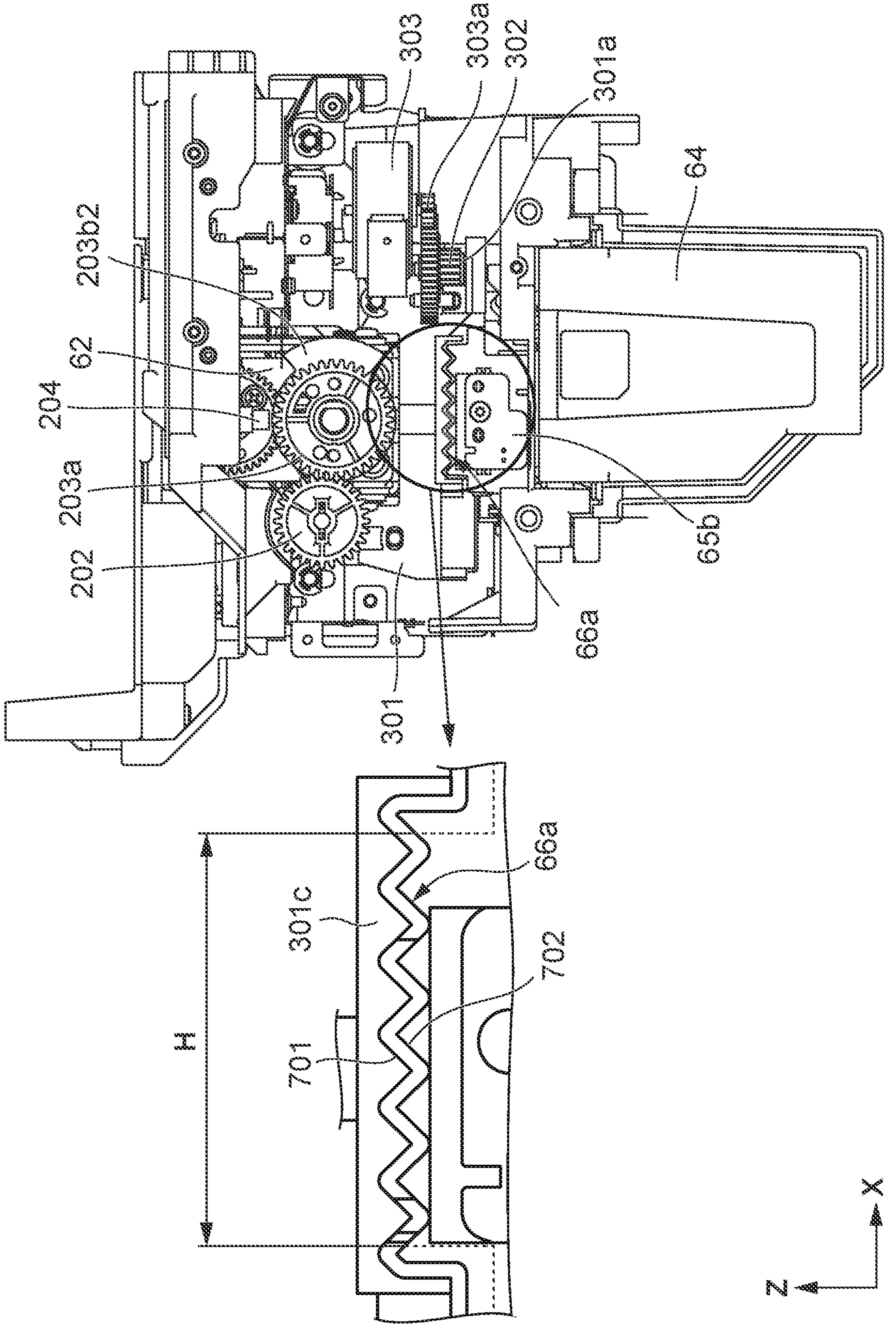
FIG. 9 is a cross-sectional view illustrating detailed shapes of a first regulating portion and a second regulating portion.
Figure 10:
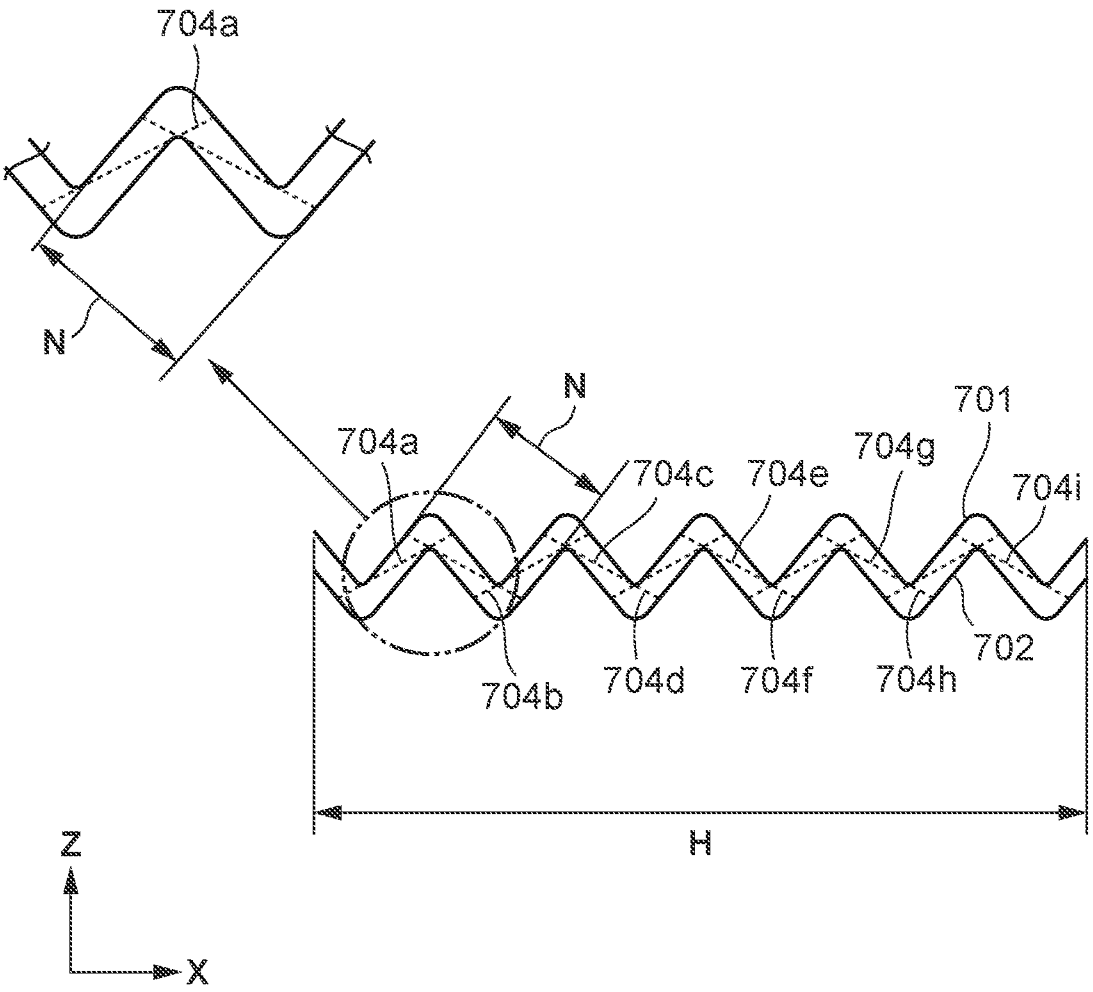
FIG. 10 is a partially enlarged view illustrating the detailed shapes of the first regulating portion and the second regulating portion.

FIG. 9 illustrates details of the first regulating portion 301*c* and the second regulating portion 66*a* according to the first exemplary embodiment and is a cross-sectional view as viewed from the +Y direction in FIG. 5. In FIG. 9, the vicinity of the first regulating portion 301*c* and the second regulating portion 66*a* is illustrated as a partially enlarged view. FIG. 10 illustrates a partially enlarged view in FIG. 9.

A first facing surface 701 of the first regulating portion 301*c* faces the second regulating portion 66*a*. A second facing surface 702 of the second regulating portion 66*a* faces the first regulating portion 301*c*.

The guide hole portion 66*b* of the receiving unit 66 has a width H in the X direction. A straight line having a longest dimension N can be arranged in a gap shape formed by the first regulating portion 301*c* and the second regulating portion 66*a*. The first facing surface 701 on the −Z direction side of the first regulating portion 301*c* and the second facing surface 702 on the +Z direction side of the second regulating portion 66*a* have shapes in which five isosceles triangles with rounded vertices and no bases are periodically arranged in the X direction. Thus, the above-described straight line having the longest dimension N exists at two locations per one shape of the isosceles triangle with rounded vertices and no base. Accordingly, the straight line having the longest dimension N according to the first exemplary embodiment exists at nine locations 704*a* to 704*i* in addition to the illustrated location. In order to prevent the punch chips from leaking out, theoretically, the punching chips will not leak out if the longest dimension N of the straight line that can be arranged in the gap shape in FIG. 9 is less than or equal to a diameter of the punching chips (not illustrated). The longest dimension N functions as a leakage stop up to 1.4 times the diameter of the punch chips (not illustrated).

Figure 11A:
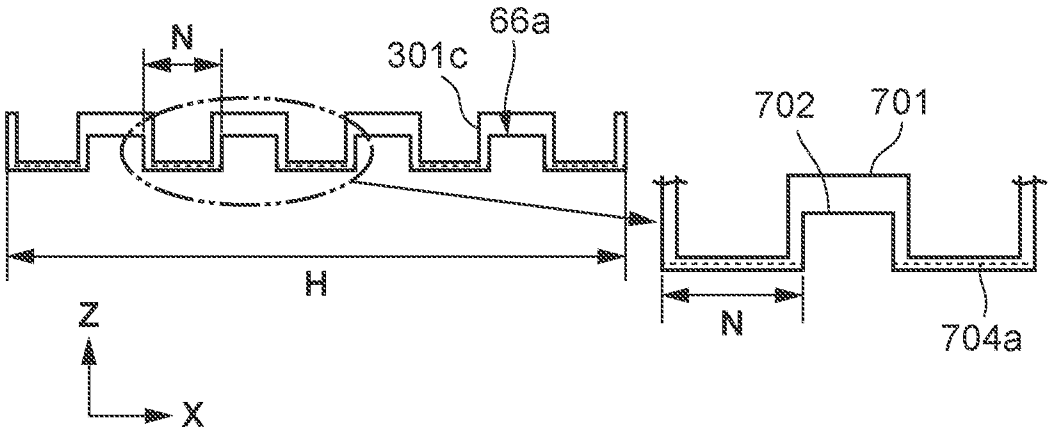
FIG. 11A is a cross-sectional view illustrating a modification example of the first regulating portion and the second regulating portion.
Figure 11B:
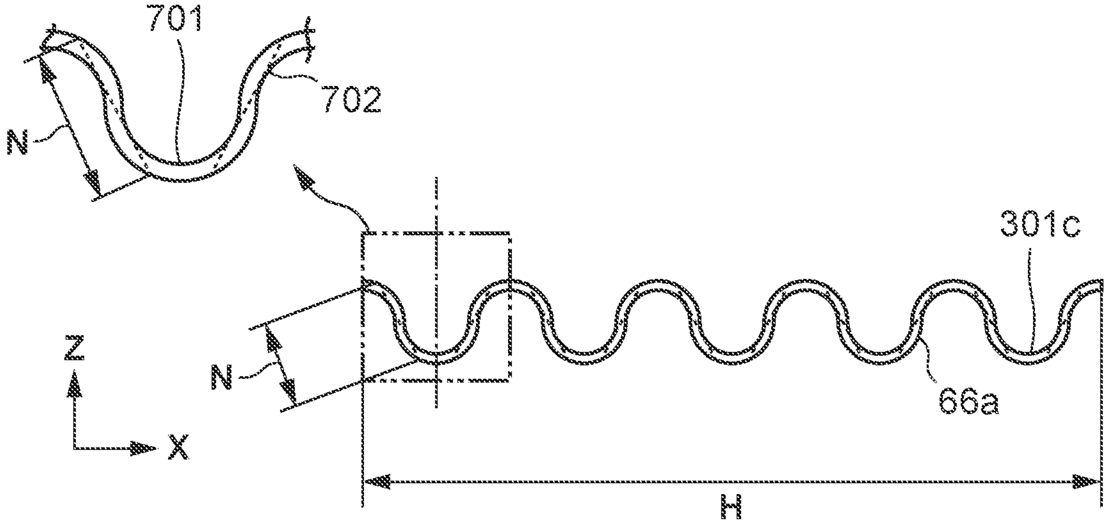
FIG. 11B is a cross-sectional view illustrating a modification example of the first regulating portion and the second regulating portion.
Figure 11C:
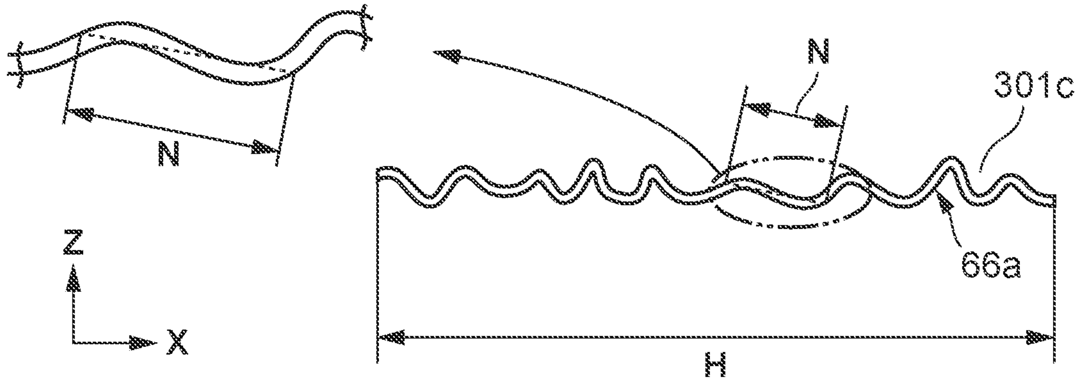
FIG. 11C is a cross-sectional view illustrating a modification example of the first regulating portion and the second regulating portion.

FIGS. 11A to 11C illustrate modification examples of the shapes of the first regulating portion 301*c* and the second regulating portion 66*a*. As illustrated in FIGS. 11A to 11C, the gap shape can be appropriately change in order to prevent the punch chips from leaking out.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-097761, filed Jun. 17, 2022, which is hereby incorporated by reference herein in its entirety.

What is claimed is:

1. A sheet processing apparatus configured to process a sheet being conveyed, the sheet processing apparatus comprising:

a first conveyance path for receiving the sheet;

a punching unit configured to punch the sheet conveyed in the first conveyance path;

a storage unit configured to be removable from the sheet processing apparatus and to store punch chips generated by the punching unit;

a movement unit configured to support the punching unit and to move together with the punching unit in a direction parallel to a movement direction of the punching unit; and a receiving unit placed between the movement unit and the storage unit and configured to receive the punch chips from the punching unit via the movement unit while supporting the movement unit, wherein the movement unit moves in the same direction as a removal direction of the storage unit with respect to the receiving unit, wherein the movement unit includes a first regulating portion configured to regulate a first gap between the movement unit and the receiving unit, and the receiving unit includes a second regulating portion configured to regulate a second gap between the receiving unit and the movement unit, and wherein, in a case where the storage unit is removed in a state in which punch chips stored in the storage unit have accumulated in the storage unit to reach the receiving unit, some of the punch chips that have reached the receiving unit are leveled by the receiving unit.

2. The sheet processing apparatus according to claim 1, wherein a third gap, which is different from the first gap and the second gap, is formed between a first facing surface of the first regulating portion that faces the second regulating portion and a second facing surface of the second regulating portion that faces the first regulating portion corresponds to a size of a blade edge of the punching unit.

3. The sheet processing apparatus according to claim 2, wherein the first facing surface includes a first plurality of irregularities.

4. The sheet processing apparatus according to claim 1, wherein the movement direction of the punching unit is a direction intersecting a rotational axis of the punching unit.

5. The sheet processing apparatus according to claim 4, wherein the second facing surface includes a second plurality of irregularities, which interact with the first plurality of irregularities to define the third gap.

6. An image forming system comprising:

an image forming apparatus configured to form an image on a sheet; and a sheet processing apparatus configured to process a sheet being conveyed, wherein the sheet processing apparatus includes:

a first conveyance path for receiving the sheet, a punching unit configured to punch the sheet conveyed in the first conveyance path, a storage unit configured to be removable from the sheet processing apparatus and to store punch chips generated by the punching unit, a movement unit configured to support the punching unit and to move together with the punching unit in a direction parallel to a movement direction of the punching unit, and a receiving unit placed between the movement unit and the storage unit and configured to receive the punch chips from the punching unit via the movement unit while supporting the movement unit, wherein the movement unit moves in the same direction as a removal direction of the storage unit with respect to the receiving unit, wherein the movement unit includes a first regulating portion configured to regulate a first gap between the movement unit and the receiving unit, and the receiving unit includes a second regulating portion configured to regulate a second gap between the receiving unit and the movement unit, and wherein, in a case where the storage unit is removed in a state in which punch chips stored in the storage unit have accumulated in the storage unit to reach the receiving unit, some of the punch chips that have reached the receiving unit are leveled by the receiving unit.

7. The image forming system according to claim 6, wherein a third gap, which is different from the first gap and the second gap, is formed between a first facing surface of the first regulating portion that faces the second regulating portion and a second facing surface of the second regulating portion that faces the first regulating portion corresponds to a size of a blade edge of the punching unit.

8. The image forming system according to claim 7, wherein the first facing surface includes a first plurality of irregularities.

9. The image forming system according to claim 8, wherein the second facing surface includes a second plurality of irregularities, which interact with the first plurality of irregularities to define the third gap.

10. The image forming system according to claim 6, wherein the movement direction of the punching unit is a direction intersecting a rotational axis of the punching unit.

* * * * *